United States Patent
Chen et al.

(10) Patent No.: US 11,445,121 B2
(45) Date of Patent: Sep. 13, 2022

(54) MOVABLE PHOTOGRAPHING SYSTEM AND PHOTOGRAPHY COMPOSITION CONTROL METHOD

(71) Applicant: Industrial Technology Research Institute, Hsinchu (TW)

(72) Inventors: Guo-Ruei Chen, Yunlin County (TW); Tzu-Yang Lin, Taipei (TW); Hui-Ping Kuo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/137,190

(22) Filed: Dec. 29, 2020

(65) Prior Publication Data

US 2022/0210334 A1 Jun. 30, 2022

(51) Int. Cl.
*H04N 5/232* (2006.01)
*G06V 10/46* (2022.01)
(Continued)

(52) U.S. Cl.
CPC ....... *H04N 5/23299* (2018.08); *G06K 9/6215* (2013.01); *G06T 3/40* (2013.01);
(Continued)

(58) Field of Classification Search
CPC ............ H04N 5/23299; H04N 5/23222; G06T 7/248; G06V 10/462; G06V 40/10; G06V 10/751
See application file for complete search history.

(56) References Cited

U.S. PATENT DOCUMENTS 8,332,429 B2 * 12/2012 Poirier ................ G06F 16/5866
707/781
9,164,506 B1 * 10/2015 Zang .................... G05D 1/0094
(Continued)

FOREIGN PATENT DOCUMENTS

CN 102809969 A 12/2012
CN 106078670 A 11/2016
(Continued)

OTHER PUBLICATIONS

Yuan-Yang Chang and Hwann-Tzong Chen, "Finding good composition in panoramic scenes," 2009 IEEE 12th International Conference on Computer Vision, 2009, pp. 2225-2231, doi: 10.1109/ICCV.2009.5459470. (Year: 2009).*
(Continued)

*Primary Examiner* — Michael Robert Cammarata

(57) ABSTRACT

A movable photographing system is provided. The movable photographing system includes a carrier, an image capturing device, a storage device and a processing device. The image capturing device is carried by the carrier and configured to generate a first image. The storage device stores a plurality of image data. The processing device obtains the feature information of a target object in the first image, and according to the feature information, compares the first image with the plurality of image data to select a reference image from the plurality of image data. In addition, the processing device generates motion information using the first image and the reference image and the carrier moves according to the motion information to adjust the shot position of the image capturing device to generate a second image.

16 Claims, 6 Drawing Sheets

(51) Int. Cl.
| | |
|---|---|
| *G06V 10/75* | (2022.01) |
| *G06V 40/10* | (2022.01) |
| *H04N 5/225* | (2006.01) |
| *G06V 40/16* | (2022.01) |
| *G06T 7/246* | (2017.01) |
| *G06K 9/62* | (2022.01) |
| *G06T 3/40* | (2006.01) |

(52) U.S. Cl.
CPC ............ *G06T 7/248* (2017.01); *G06V 10/462* (2022.01); *G06V 10/751* (2022.01); *G06V 40/10* (2022.01); *G06V 40/161* (2022.01); *H04N 5/2253* (2013.01); *H04N 5/23219* (2013.01); *H04N 5/23222* (2013.01); *G06T 2207/30196* (2013.01)

(56) References Cited

U.S. PATENT DOCUMENTS

| | | | |
|---|---|---|---|
| 9,854,155 B1 | 12/2017 | Sikka et al. | |
| 10,277,889 B2 | 4/2019 | Nash et al. | |
| 10,635,902 B2* | 4/2020 | Lee ................ | B64C 39/024 |
| 10,694,097 B1* | 6/2020 | Shirakyan ........... | G06V 40/103 |
| 11,184,558 B1* | 11/2021 | Zhang .................. | G06V 10/255 |
| 2007/0109429 A1* | 5/2007 | Suzuki ................. | H04N 5/772 |
| | | | 386/E5.067 |
| 2012/0093361 A1* | 4/2012 | Huang ................... | G06T 7/277 |
| | | | 382/103 |
| 2012/0268612 A1* | 10/2012 | Wang ..................... | G06V 10/40 |
| | | | 348/207.1 |
| 2014/0362238 A1* | 12/2014 | Ogura .................... | G06T 7/248 |
| | | | 348/207.11 |
| 2015/0010239 A1* | 1/2015 | He ..................... | H04N 5/23222 |
| | | | 382/203 |
| 2015/0117783 A1* | 4/2015 | Lin .......................... | G06T 7/11 |
| | | | 382/195 |
| 2015/0189186 A1* | 7/2015 | Fahn .................. | H04N 5/23229 |
| | | | 348/239 |
| 2016/0142625 A1* | 5/2016 | Weksler ........... | H04N 5/232933 |
| | | | 348/222.1 |
| 2016/0286128 A1 | 9/2016 | Zhou | |
| 2017/0180623 A1* | 6/2017 | Lin ..................... | G11B 27/031 |
| 2018/0046188 A1* | 2/2018 | Hwang ............... | G08G 5/0021 |
| 2018/0060690 A1* | 3/2018 | Lee ........................ | H04N 5/265 |
| 2018/0150073 A1 | 5/2018 | Lee et al. | |
| 2018/0302553 A1* | 10/2018 | Weng .................. | H04N 5/23218 |
| 2019/0161186 A1* | 5/2019 | Chen ................... | H04N 5/23296 |
| 2019/0246042 A1* | 8/2019 | Liu .......................... | G06T 7/75 |
| 2020/0256944 A1* | 8/2020 | Glover ............... | H04N 5/23299 |
| 2021/0009270 A1* | 1/2021 | Chen .................... | G05D 1/0816 |
| 2021/0067684 A1* | 3/2021 | Kim ...................... | G06K 9/6218 |
| 2021/0092281 A1* | 3/2021 | Tanaka ................ | H04N 5/23218 |

FOREIGN PATENT DOCUMENTS

| | | |
|---|---|---|
| CN | 106096573 A | 11/2016 |
| CN | 107463180 A | 12/2017 |
| JP | 2012151758 A * | 8/2012 |
| TW | I279739 | 4/2007 |
| TW | 201237773 | 9/2012 |
| TW | I405133 B | 8/2013 |
| TW | I511081 B | 12/2015 |
| TW | 201826131 | 7/2018 |
| TW | 201839663 A | 11/2018 |
| TW | I673682 B | 10/2019 |
| TW | I696122 B | 6/2020 |
| WO | WO-2018192244 A1 * | 10/2018 ......... G06K 9/00664 |
| WO | WO2019157690 A1 | 8/2019 |
| WO | WO-2020000096 A1 * | 1/2020 .......... A61B 5/1116 |
| WO | WO-2022042776 A1 * | 3/2022 |

OTHER PUBLICATIONS

S. Ma, Y. Fan and C. W. Chen, "Finding your spot: A photography suggestion system for placing human in the scene," 2014 IEEE International Conference on Image Processing (ICIP), 2014, pp. 556-560, doi: 10.1109/ICIP.2014.7025111. (Year: 2014).*

Yao, L., Suryanarayan, P., Qiao, M. et al. OSCAR: On-Site Composition and Aesthetics Feedback Through Exemplars for Photographers. Int J ComputVis 96, 353-383 (2012). (Year: 2012).*

C. Huang, F. Gao, J. Pan, Z. Yang, W. Qiu, P. Chen, et al., "Act: An autonomous drone cinematography system for action scenes", 2018 IEEE International Conference on Robotics and Automation (ICRA), pp. 7039-7046, 2018. (Year: 2018).*

P. P. Wang, Wei Zhang, Jianguo Li and Yimin Zhang, "Online photography assistance by exploring geo-referenced photos on MID /UMPC," 2008 IEEE 10th Workshop on Multimedia Signal Processing, 2008, pp. 6-10, doi: 10.1109/MMSP.2008.4665040. (Year: 2008).*

Taiwan Patent Office, Office Action, Patent Application Serial No. 109146701, dated Nov. 26, 2021, Taiwan.

Cho, Sunyoung, et al., "Learning Drone-control Actions in Surveillance Videos", 2017 17th International Conference on Control, Automation and Systems (ICCAS), Oct. 2017, pp. 700-703, ICROS, US.

Huang, Chong, et al., "Learning to Capture a Film-Look Video with a Camera Drone", 2019 International Conference on Robotics and Automation (ICRA), May 2019, pp. 1871-1877, IEEE, US.

Shen Qifeng, et al. "Person Tracking and Frontal Face Capture with UAV", 2018 IEEE 18th International Conference on Communication Technology (ICCT), 2018, pp. 1412-1416, IEEE, US.

Huang, Chong, et al., "Through-the-Lens Drone Filming", 2018 IEEE/RSJ International Conference on Intelligent Robots and Systems (IROS), Oct. 2018, pp. 4692-4699, IEEE, US.

Manawadu, Udaka A., et al. "A Study of Automated Image Capturing HDI Environment using NAVIO2", 2018 IEEE 7th Global Conference on Consumer Electronics (GCCE), 2018, pp. 308-311, IEEE, US.

Wang, Xiaowei, et al., "Drone were me: Flying Drone as Avatar by Aligned Stereo View and Head Pose", 2016 IEEE 5th Global Conference on Consumer Electronics, 2016, 2 pages, IEEE, US.

Lin, Chyu-Yeu and Chung-Yi Liang. "Innovative Drone Selfie System and Implementation", 2017 International Symposium on Computer Science and Intelligent Controls (ISCSIC), 2017, pp. 135-140, IEEE, US.

Barajas, Manlio, et al., "Visual Servoing of UAV Using Cuboid Model with Simultaneous Tracking of Multiple Planar Faces", 2013 IEEE/RSJ International Conference on Intelligent Robots and Systems (ORPS), 2013, pp. 596-601, IEEE, US.

Yadav, Himanshi, et al., "A Real-Time Ball Trajectory Follower Using Robot Operating System", 2015 Third International Conference on Image Information Processing, 2015, 6 Pages, IEEE, US.

* cited by examiner

MOVABLE PHOTOGRAPHING SYSTEM AND PHOTOGRAPHY COMPOSITION CONTROL METHOD

BACKGROUND

Field of the Disclosure

The disclosure generally relates to photography composition control technology, and more particularly, to a photography composition control technology in which a composition of an image is generated based on the composition of a reference image.

Description of the Related Art

As technology has progressed, photographing devices have become a standard feature in mobile phones. Therefore, the application scenarios of the photography become diversified. In addition, due to the growing popularity of social network sites, posting selfies and live-streaming are currently very popular. In order to take a better selfie, many people may take selfie by a selfie stick. However, the selfie is still limited to the extension distance of the selfie stick, and as a result, some problems may occur, such as the photographing device being too close to the subject, the edge of the image being distorted, the selfie stick appearing in the image, and in the case of group selfies, not being able to fit all the subjects in the same shot. In addition, a tripod can also be used to solve the distance problem, but the angle of the shot will be limited to the tripod, and cannot be adjusted immediately.

In order to overcome the limitations of distance and space, in recent years, more and more people have been using unmanned aerial vehicles (or drones) to take selfies. However, traditionally, when a user uses a drone to take a selfie, the user may spend a lot of time adjusting the shot position and shot angle to obtain a satisfactory composition. Therefore, how to use a drone to take selfies more efficiently and to obtain a satisfactory composition is a subject worthy of discussion.

BRIEF SUMMARY

A movable photographing system and photography composition control method are provided.

An embodiment of the disclosure provides a movable photographing system. The movable photographing system comprises a carrier, an image capturing device, a storage device and a processing device. The image capturing device is carried by the carrier and configured to generate a first image. The storage device stores a plurality of image data. The processing device obtains the feature information of a target object in the first image, and according to the feature information, compares the first image with the image data to select a reference image from the image data. In addition, the processing device generates motion information based on the first image and the reference image, and the carrier moves according to the motion information to adjust the shot position of the image capturing device to generate a second image.

An embodiment of the disclosure provides a photography composition control method. The photography composition control method is applied to a movable photographing system. The method applied to a movable photographing system comprises the steps of using an image capturing device of the movable photographing system to generate a first image, wherein the image capturing device is carried by a carrier; using a processing device of the movable photographing system to obtain the feature information of a target object in the first image; using the processing device to compare the first image with a plurality of image data stored in a storage device of the movable photographing system according to the feature information to select a reference image from the image data; using the processing device to generate motion information based on the first image and the reference image; and moving the carrier according to the motion information to adjust a shot position of the image capturing device to generate a second image.

Other aspects and features of the disclosure will become apparent to those with ordinary skill in the art upon review of the following descriptions of specific embodiments of movable photographing system and photography composition control method.

BRIEF DESCRIPTION OF THE DRAWINGS

The disclosure will become more fully understood by referring to the following detailed description with reference to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
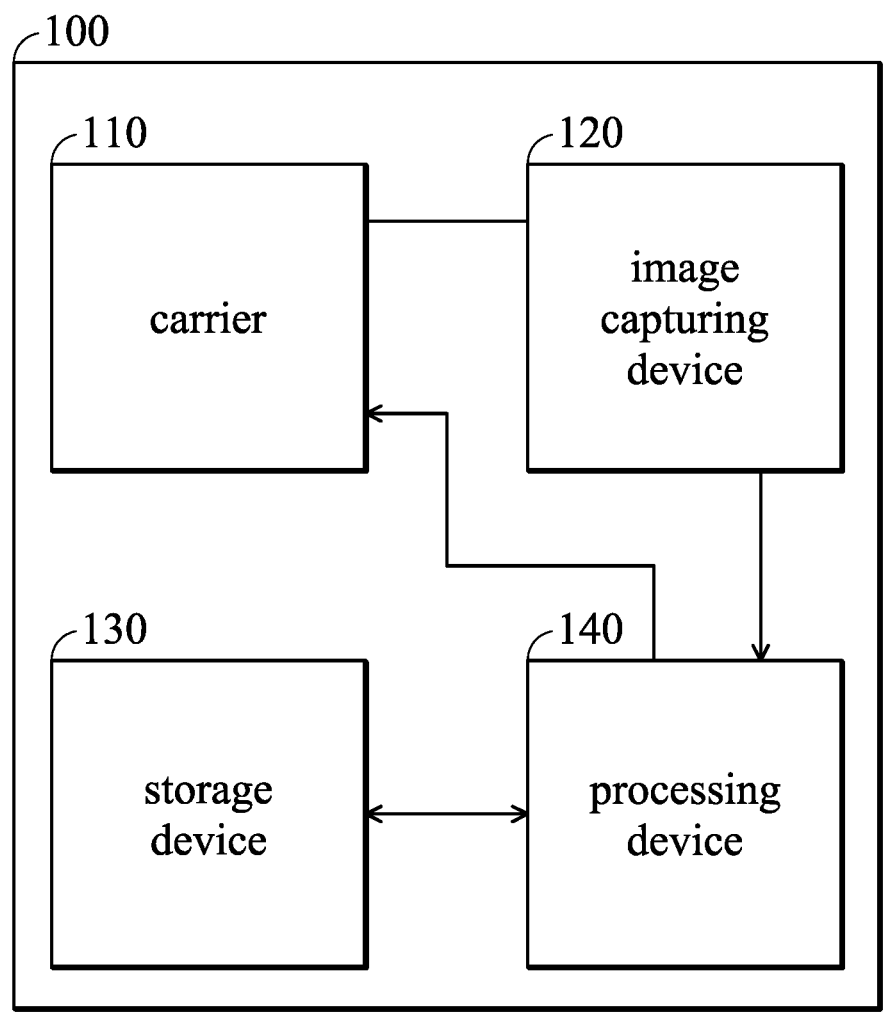
FIG. 1 is a movable photographing system 100 according to an embodiment of the disclosure.

FIG. 1 is a movable photographing system 100 according to an embodiment of the disclosure. As shown in FIG. 1, the movable photographing system 100 may comprise a carrier 110, an image capturing device 120, a storage device 130 and a processing device 140. It should be noted that FIG. 1 presents a simplified block diagram in which only the elements relevant to the disclosure are shown. However, the disclosure should not be limited to what is shown in FIG. 1. The movable photographing system 100 may also comprise other elements and devices. According to an embodiment of the disclosure, the storage device 130 and the processing device 140 may be configured in the carrier 110. According to another embodiment of the disclosure, the processing device 140 is configured in the carrier 110.

According to an embodiment of the disclosure, the carrier 110 may be an unmanned aerial vehicle (UAV) (or drone), a robotic arm or other devices which can perform three-dimensional movement, but the disclosure should not be limited thereto. The carrier 110 may be configured to carry the image capturing device 120 to adjust the shot position of the image capturing device 120.

According to an embodiment of the disclosure, the image capturing device 120 may be a camera. The image capturing device 120 may comprise a charge-coupled device (CCD) sensor, a complementary metal-oxide semiconductor (CMOS) sensor or other image sensors to capture the images and videos.

According to the embodiments of the disclosure, the storage device 130 may be a volatile memory (e.g. Random Access Memory (RAM)), or a non-volatile memory (e.g. flash memory, Read Only Memory (ROM)), a hard disk, or a combination of the above memory devices. In addition, in another embodiment of the disclosure, the storage device 130 may be a cloud database. The storage device 130 may be configured to store a plurality of image data. In an embodiment, the processing device 140 may obtain the image data form the storage device 130 directly. In an embodiment, a communication device (not shown in figures) of the movable photographing system 100 may obtain the image data form the storage device 130 first, and then the processing device 140 may obtain the image data form the communication device.

According to the embodiments of the disclosure, the processing device 140 may be a microprocessor, microcontroller or image processing chip, but the disclosure should not be limited thereto. The processing device 140 may be configured in the carrier 110 or configured in a back-end computer (not shown in figures).

According to an embodiment of the disclosure, when user wants to take a photo of an image with a better composition, the image capturing device 120 carried by the carrier 110 may first photograph a target object to generate a first image. According to embodiments of the disclosure, the target object may be a human, a salient object in the framing shot, or a landscape, but the disclosure should not be limited thereto.

After the first image is generated, the processing device 140 may adopt a suitable feature capturing algorithm to obtain the feature information of the target object in the first image. That is to say, the processing device 140 may adopt different feature capturing algorithms according to the attribute of the target object. According to an embodiment of the disclosure, the feature information may comprise the human-body feature information, the salient-object feature information or the environment feature information.

According to an embodiment of the disclosure, when the target object is human, the processing device 140 may adopt a pedestrian detection algorithm (e.g. histogram of oriented gradient (HOG) algorithm, You Only Look Once (YOLO) algorithm, but the disclosure should not be limited thereto), a facial detection algorithm (e.g. Soft Stagewise Regression Network (SSR-Net) algorithm, but the disclosure should not be limited thereto) or a human skeleton detection algorithm (e.g. OpenPose algorithm or a Move Mirror algorithm, but the disclosure should not be limited thereto) to obtain the feature information (i.e. the human-body feature information) of the target object (i.e. the human in the first image) in the first image.

According to another embodiment of the disclosure, when the target object is the salient object in the framing shot, the processing device 140 may adopt a salient-object detection algorithm (e.g. Boundary-Aware Salient Object Detection (BASNet) algorithm, or Going Deeper with Nested U-Structure for Salient Object Detection (U2-Net) algorithm, but the disclosure should not be limited thereto) to obtain the feature information (i.e. the salient object feature information) of the target object (i.e. the salient object in the first image) in the first image.

According to another embodiment of the disclosure, when the target object is a landscape, the processing device 140 may adopt an environment detection algorithm (Point-wise Spatial Attention Network for Scene Parsing (PSANet) algorithm or Object Context Network for Scene Parsing (OCNet) algorithm, but the disclosure should not be limited thereto) to obtain the feature information (i.e. the environment feature information) of the target object (i.e. the landscape in the first image, e.g. mountain, sea, or buildings, but the disclosure should not be limited thereto) in the first image.

Figure 2A:
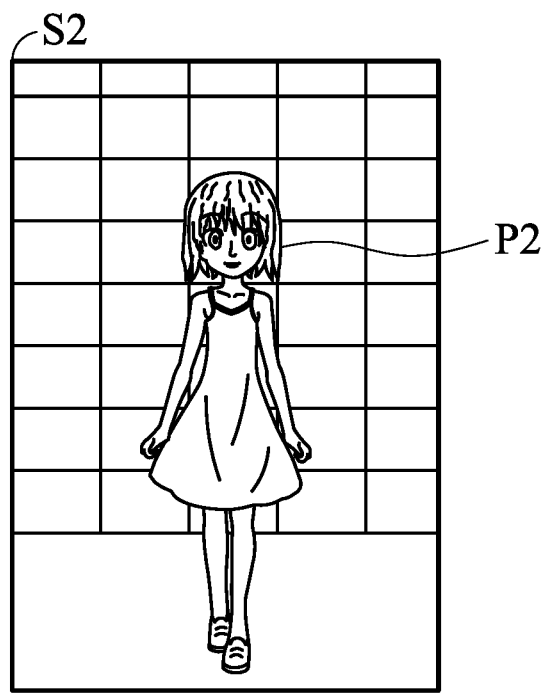
FIG. 2A-2B are schematic diagram of a reference image and a first image according to an embodiment of the disclosure.
Figure 2B:
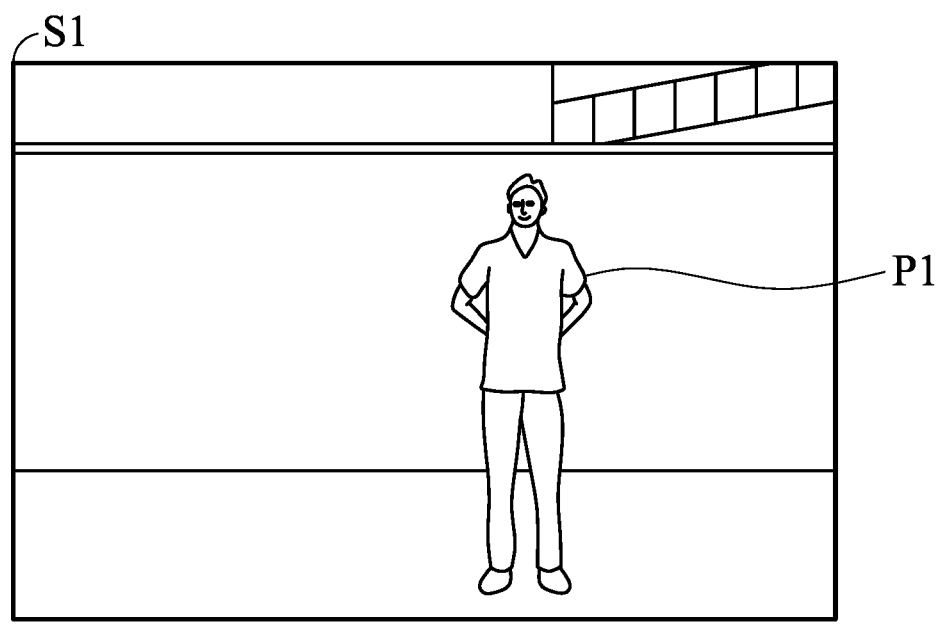

According to an embodiment of the disclosure, when the processing device 140 obtains the feature information of the target object in the first image, the processing device 140 may compare the first image with each image data stored in the storage device 130 according to the feature information of the target object to select a reference image from the image data. Specifically, the processing device 140 may compare the target object in the first image with the similar target object (corresponding to the target object) in each image data according to the feature information of the target object to obtain the similarity between the first image and each image data and select the image data which has the highest degree of similarity with the first image to be the reference image. Taking FIG. 2A-2B for example, according to the feature information of the target object P1 in the first image S1 (FIG. 2B), the processing device 140 may select the reference image S2 (FIG. 2A) which has the highest degree of similarity with the first image S1. That is to say, in the reference image S2, the similar target object P2 corresponding to the target object P1 has the closest posture as the target object P1.

Figure 3:
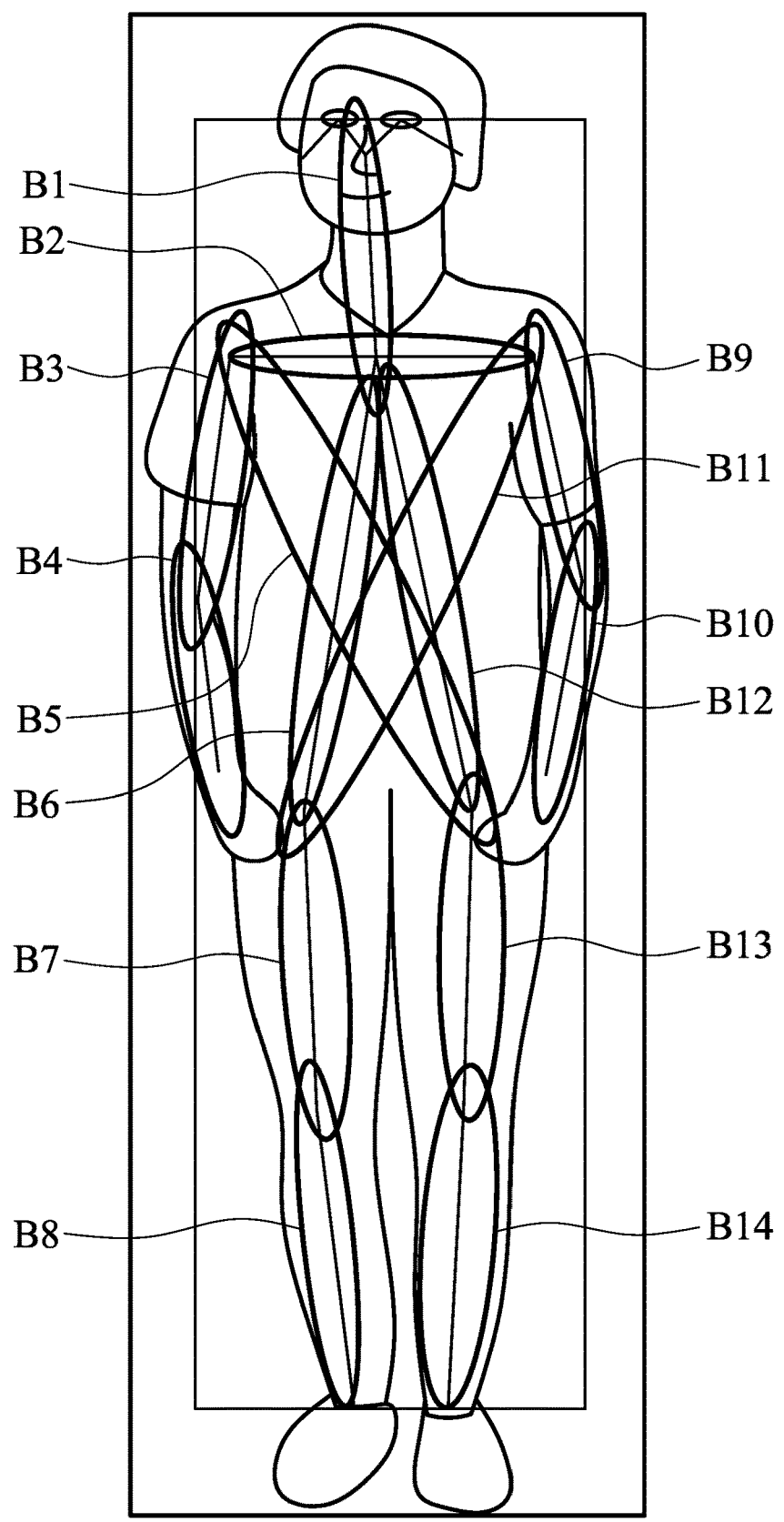
FIG. 3 is a schematic diagram of human skeletons according to an embodiment of the disclosure.

According to an embodiment of the disclosure, if the processing device 140 adopts a human skeleton detection algorithm to obtain the feature information (e.g. the skeleton information of the target object) of the target object in the first image, the processing device 140 may calculate the similarities between each skeleton of the target object in the first image and each skeleton of the similar target object in each image data. FIG. 3 is taken as an example for illustration below. As shown in FIG. 3, according to an embodiment of the disclosure, the human skeletons may be divided into 14 parts, but the disclosure should not be limited thereto. The processing device 140 may calculate the similarities between the 14 parts of skeletons B1~B14 of the target object and each skeleton of the similar target object in each image data according to a similarity formula. The similarity formula is shown below:

$$\text{similarity} = \sum_{n=1}^{14} \mu_n \vec{S_n} \cdot \vec{S'_n},$$

$$\mu_n = \frac{\|S_n - m\|_2}{\sqrt{\sum_{n=1}^{14} \|S_n - m\|_2}},$$

wherein $\mu_n$ means the weight of each skeleton, $S_n$ means the vector value of the n-th skeleton of the target object, $S'_n$ means the vector value of the n-th skeleton of the similar target object, and m means the center of the target object. According to the above similarity formula, we can know that the skeleton which is closer to the center of the target object may have larger weight. It should be noted that the human skeleton detection algorithm adopted in the embodiment is used to take as an example, but the disclosure should not be limited thereto.

According to another embodiment of the disclosure, if the processing device 140 adopts a salient-object detection algorithm to obtain the feature information (e.g. the salient-object feature information) of the target object in the first image, the processing device 140 may calculate the similarity between the salient object in the first image and the salient object in each image data and select the image data which has the highest degree of similarity with the first image to be the reference image. In the embodiment, the processing device 140 may calculate the similarity between the salient object in the first image and the salient object in each image data according to a difference formula of the salient object. The difference formula of the salient object is shown below:

$$\text{difference of the salient object} = \min \sum_{i=1}^{n} \|S_C - D_{C_i}\|_2$$

wherein $S_C$ means the coordinates of the salient object in the first image, and $D_{C_i}$ means the coordinates of the salient object in each image data. It should be noted that the difference formula of the salient object adopted in the embodiment is used to take as an example, but the disclosure should not be limited thereto.

According to another embodiment of the disclosure, if the processing device 140 adopts an environment detection algorithm to obtain the feature information (e.g. the environment feature information) of the target object (i.e. mountain, sea, or buildings in the first image, but the disclosure should not be limited thereto) in the first image, the processing device 140 may calculate the similarity between the landscape in the first image and the landscape in each image data and select the image data which has the highest degree of similarity with the first image to be the reference image.

According to an embodiment of the disclosure, when the processing device 140 obtains the reference image, the processing device 140 may obtain the motion information based on the coordinates of the region of interest (ROI) of the first image and the coordinates of the ROI of the reference image. In the embodiment, the ROI of the first image may be regarded as the target object in the first image and the ROI of the reference image may be regarded as the similar target object in the reference image. According to an embodiment of the disclosure, the processing device 140 may calculate the area of the ROI of the first image and the area of the ROI of the reference image according to the coordinates on the X-axis and the coordinates on the Y-axis of the ROI of the first image, and the coordinates on the X-axis and the coordinates on the Y-axis of the ROI of the reference image, and then calculate the change of the Z-axis (i.e. the motion information) between the ROI of the first image and the ROI of the reference image according to the area of the ROI of the first image and the area of the ROI of the reference image. According to an embodiment of the disclosure, the processing device 140 may calculate the area of the ROI of the first image according to the formula shown below:

$$Sa = \frac{1}{2}\left(\left|\begin{matrix}x_0 & x_1\\ y_0 & y_1\end{matrix}\right| + \left|\begin{matrix}x_1 & x_2\\ y_1 & y_2\end{matrix}\right| + \ldots + \left|\begin{matrix}x_{n-2} & x_{n-1}\\ y_{n-2} & y_{n-1}\end{matrix}\right| + \left|\begin{matrix}x_{n-1} & x_1\\ y_{n-1} & y_1\end{matrix}\right|\right),$$

wherein Sa means the area of the ROI of the first image, and $(x_0, y_0), (x_1, y_1) \ldots (x_{n-1}, y_{n-1})$ mean the coordinates in the outer contour of the ROI of the first image. The calculation of the area of the ROI of the reference image is similar to the first image. Therefore, details will not be repeated. After the processing device 140 obtains the area of the ROI of the first image and the area of the ROI of the reference image, the processing device 140 may calculate the change of the Z-axis (i.e. the motion information) between the ROI of the first image and the ROI of the reference image according to the formula below:

$$dz = Sa/Sb,$$

wherein Sb means the area of the ROI of the reference image, and dz means the change of the Z-axis (i.e. the motion information) between the ROI of the first image and the ROI of the reference image.

After the processing device 140 generates the motion information, the carrier 110 may move according to the motion information to adjust the shot position of the image capturing device 120 (e.g. the shot angle, the shot height and the shot distance of the image capturing device 120, but the disclosure should not be limited thereto). After the shot position of the image capturing device 120 is adjusted, the image capturing device 120 may generate a second image which has similar composition as the reference image.

According to an embodiment of the disclosure, the processing device 140 may further determine whether the composition of the second image matches the composition of the reference image according to the coordinates of the ROI of the second image and the coordinates of the ROI of the reference image. If the composition of the second image does not match the composition of the reference image, the processing device 140 of the movable photographing system 100 may calculate the areas of the ROI of the second image and the ROI of the reference image, and calculate the new motion information based on the areas of the ROI of the second image and the ROI of the reference image. The carrier 110 may move again according to the new motion information to adjust the shot position of the image capturing device 120.

Figure 4A:
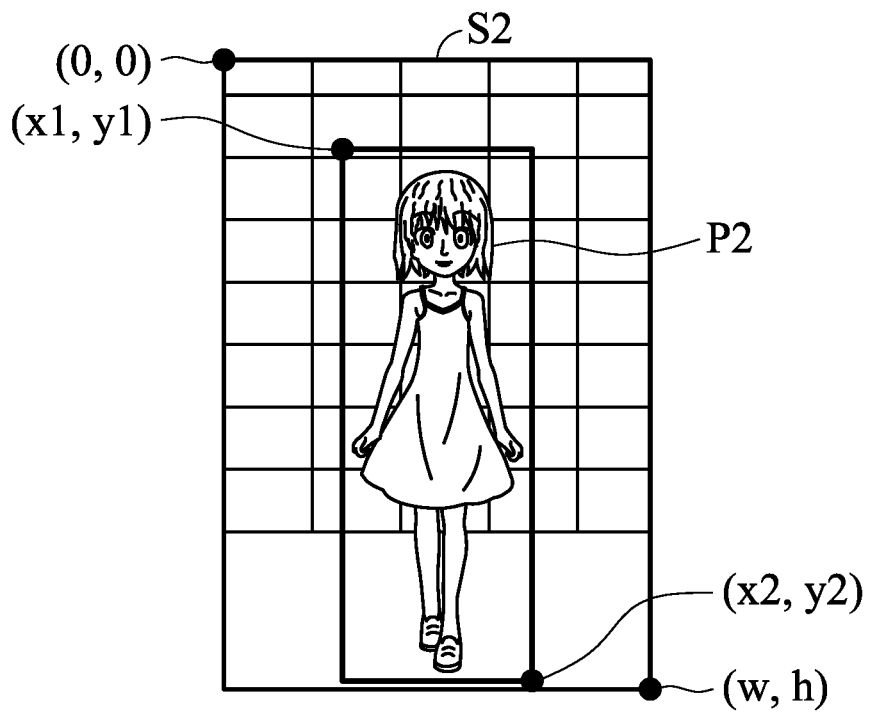
FIG. 4A-4C are schematic diagrams of a reference image, a first image and a second image according to an embodiment of the disclosure.
Figure 4B:
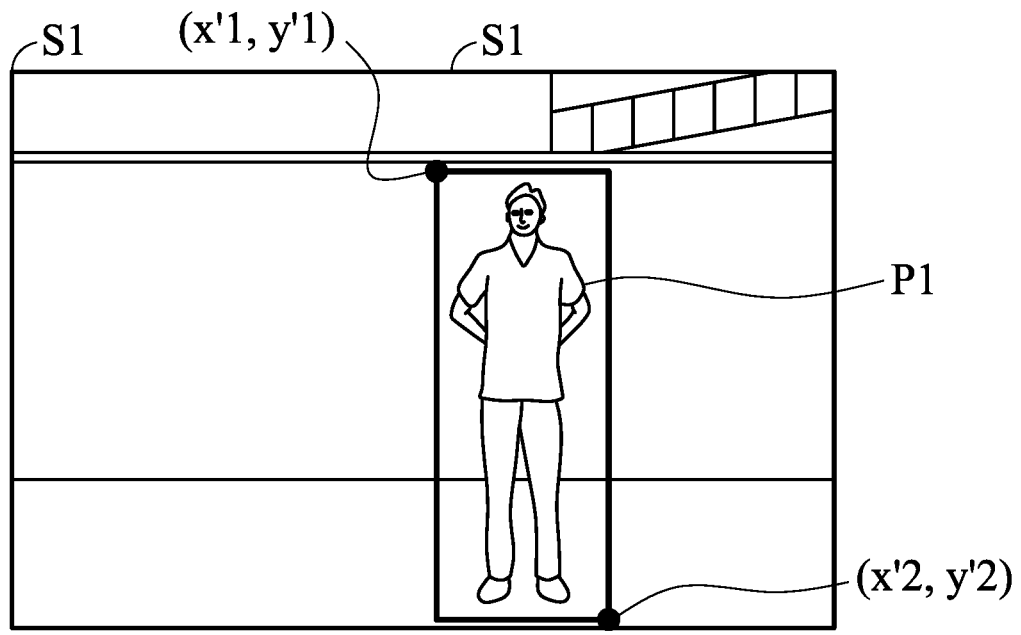
Figure 4C:

According to an embodiment of the disclosure, the processing device 140 may adjust the size of the second image according to the reference image and the first image. That is to say, the size of the second image may be different from the size of the first image. Taking FIGS. 4A-4C as an example, the processing device 140 may determine the size of the second image S3 (FIG. 4C) according to the size of the target object P1 in the first image S1 (FIG. 4B) and the size of the similar target object P2 corresponding to the target object P1 in the reference image S2 (FIG. 4A). In FIG. 4A, w is indicated as the width of the reference image S2, h is indicated as the height of the reference image S2, (x1, y1) is indicated as the coordinates of the upper-left corner of the similar target object P2, and (x2, y2) is indicated as the coordinates of the lower-right corner of the similar target object P2. In FIG. 4B, (x'1, y'1) is indicated as the coordinates of the upper-left corner of the target object P1, and (x'2, y'2) is indicated as the coordinates of the lower-right corner of the target object P1.

In an embodiment of the disclosure, the processing device 140 may calculate the size of the second image S3 according to the following formulas:

the aspect ratio of the reference image $S2=w/h$;

the height ratio of the similar target object $P2=h/(y2-y1)$;

the height of the second image $S3=(y'2-y'1)*$(the height ratio of the similar target object $P2$);

the width of the second image $S3=$(the height of the second image $S3)*$(the aspect ratio of the reference image $S2$).

In another embodiment of the disclosure, the processing device 140 may calculate the size of the second image S3 according the following formulas:

the distance between the target object $P1$ and the right boundary of the second image $S3=(x'2-x'1)*(w-x2)/(x2-x1)$;

the distance between the target object $P1$ and the left boundary of the second image $S3=(x'2-x'1)*(x1-0)/(x2-x1)$;

the distance between the target object $P1$ and the upper boundary of the second image $S3=(y'2-y'1)*(y1-0)/(y2-y1)$;

the distance between the target object $P1$ and the lower boundary of the second image $S3=(y'2-y'1)*(h-y2)/(y2-y1)$.

According another embodiment of the disclosure, the user can upload a reference image to the storage device 130 directly to provide the reference image to the processing device 140 for following operations. That is to say, in the embodiment, the processing device 140 may move the carrier 110 directly by analyzing the composition of the reference image to adjust the shot position of the image capturing device 120 (e.g. the shot angle, shot height and the shot distance of the image capturing device 120, but the disclosure should not be limited thereto).

Figure 5:
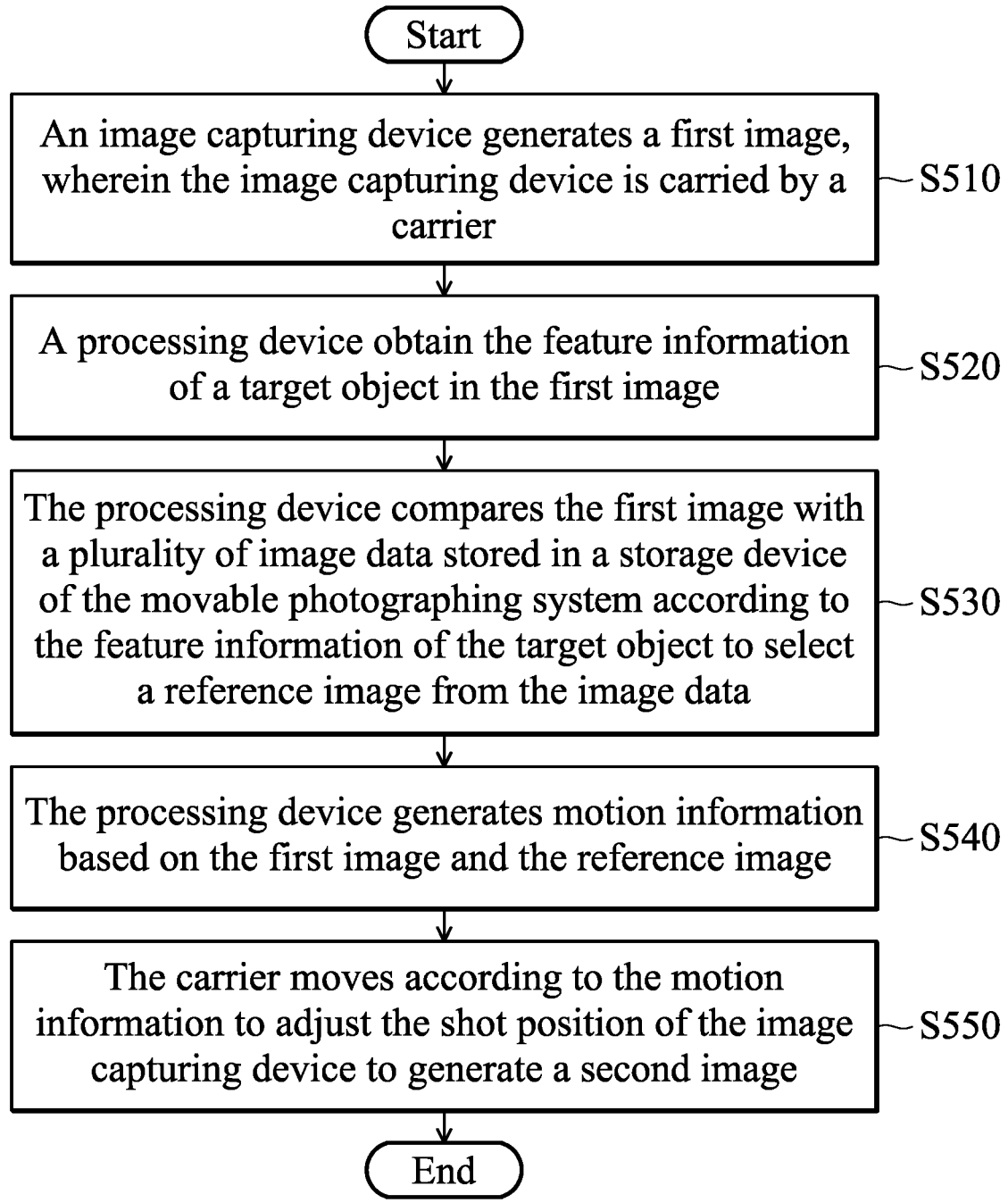
FIG. 5 is a flow chart illustrating a photography composition control method according to an embodiment of the disclosure.

FIG. 5 is a flow chart illustrating a photography composition control method according to an embodiment of the disclosure. The photography composition control method can be applied to the movable photographing system 100. As shown in FIG. 5, in step S510, an image capturing device of the movable photographing system 100 generates a first image, wherein the image capturing device is carried by a carrier.

In step S520, a processing device of the movable photographing system 100 may obtain the feature information of a target object in the first image.

In step S530, the processing device of the movable photographing system 100 may compare the first image with a plurality of image data stored in a storage device of the movable photographing system 100 according to the feature information of the target object to select a reference image from the image data.

In step S540, the processing device of the movable photographing system 100 may generate motion information based on the first image and the reference image.

In step S550, the carrier may move according to the motion information to adjust the shot position of the image capturing device to generate a second image.

According to an embodiment of the disclosure, in the photography composition control method, the feature information may comprise the human-body feature information, the salient-object feature information or the environment feature information.

According to an embodiment of the disclosure, in the photography composition control method, the processing device of the movable photographing system 100 may obtain the human-body feature information based on a pedestrian detection algorithm, a facial detection algorithm and a human skeleton detection algorithm. According to another embodiment of the disclosure, the processing device of the movable photographing system 100 may obtain the salient-object feature information based on a salient-object detection algorithm. According to another embodiment of the disclosure, the processing device of the movable photographing system 100 may obtain the environment feature information based on an environment detection algorithm.

According to an embodiment of the disclosure, in step S530 of the photography composition control method, the processing device of the movable photographing system 100 may calculate the similarities between a plurality of skeletons of the target object with the image data according to the feature information to compare the first image with the image data, and select the image data corresponding to the highest degree of similarity to be the reference image. In the embodiment, the skeletons may have different weights.

According to an embodiment of the disclosure, in step S540 of the photography composition control method, the processing device of the movable photographing system 100 may calculate the areas of the region of interest (ROI) of the first image and the ROI of the reference image, and generates the motion information based on the areas of the ROI of the first image and the ROI of the reference image.

According to an embodiment of the disclosure, after step S550, the photography composition control method may further comprise that the processing device of the movable photographing system 100 may determine whether the composition of the second image matches the composition of the reference image according to the coordinates of the ROI of the second image and the coordinates of the ROI of the reference image. If the composition of the second image does not match the composition of the reference image, the processing device of the movable photographing system 100 may calculate the areas of the ROI of the second image and the ROI of the reference image, and calculate the new motion information based on the areas of the ROI of the second image and the ROI of the reference image. The carrier may move again according to the new motion information to adjust the shot position of the image capturing device.

According to an embodiment of the disclosure, in the photography composition control method, the processing device of the movable photographing system 100 may adjust the size of the second image according to the first image and the reference image.

According to the movable photographing system and photography composition control method provided in the disclosure, the shot position of the image capturing device can be adjusted automatically by referring the composition of the reference image to generate the image which has the similar composition as the reference image. Therefore, according to the movable photographing system and photography composition control method provided in the disclosure, the user can obtain the image with ideal composition without wasting a lot of hand-operation time.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the disclosure can be accomplished by many methods, and any specific configurations or functions in the disclosed embodiments only present a representative condition. Those who are skilled in this technology will understand that all of the disclosed aspects in the disclosure can be applied independently or be incorporated.

While the disclosure has been described by way of example and in terms of preferred embodiment, it should be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A movable photographing system, comprising:
   a carrier;
   an image capturing device, carried by the carrier and configured to generate a first image;
   a storage device, storing a plurality of image data; and
   a processing device, obtaining feature information of a target object in the first image, and according to the feature information, comparing the first image with the plurality of image data to select a reference image from the plurality of image data,
   wherein the processing device generates motion information based on the first image and the reference image and the carrier moves according to the motion information to adjust a shot position of the image capturing device to generate a second image,
   wherein the processing device calculates similarities between a plurality of skeletons of the target object with the plurality of image data according to the feature information to compare the first image with the plurality of image data and selects the image data corresponding to the highest degree of similarity to be the reference image.

2. The movable photographing system of claim 1, wherein the feature information may comprise human-body feature information, salient-object feature information or environment feature information.

3. The movable photographing system of claim 2, wherein the processing device obtains the human-body feature information according to a pedestrian detection algorithm, a facial detection algorithm and a human skeleton detection algorithm.

4. The movable photographing system of claim 2, wherein the processing device obtains the salient-object feature information according to a salient-object detection algorithm.

5. The movable photographing system of claim 2, wherein the processing device obtains the environment feature information according to an environment detection algorithm.

6. The movable photographing system of claim 1, wherein the plurality of skeletons have different weights.

7. The movable photographing system of claim 1, wherein the processing device calculates areas of the region of interest (ROI) of the first image and the ROI of the reference image, and according to the areas of the ROI of the first image and the ROI of the reference image, generates the motion information.

8. The movable photographing system of claim 1, wherein the processing device adjusts a size of the second image according to the first image and the reference image.

9. A photography composition control method, applied to a movable photographing system, comprising:
   generating, by an image capturing device of the movable photographing system, a first image, wherein the image capturing device is carried by a carrier;
   obtaining, by a processing device of the movable photographing system, feature information of a target object in the first image;
   calculating, by the processing device, similarities between a plurality of skeletons of the target object with a plurality of image data stored in a storage device of the movable photographing system according to the feature information to compare the first image with the plurality of image data;
   selecting the image data corresponding to the highest degree of similarity to be the reference image;
   generating, by the processing device, moving information according to the first image and the reference image; and
   moving the carrier according to the moving information to adjust the a shot position of the image capturing device to generate a second image.

10. The photography composition control method of claim 9, wherein the feature information may comprise human-body feature information, salient-object feature information or environment feature information.

11. The photography composition control method of claim 10, wherein the processing device obtains the human-body feature information according to a pedestrian detection algorithm, a facial detection algorithm and a human skeleton detection algorithm.

12. The photography composition control method of claim 10, wherein the processing device obtains the salient-object feature information according to a salient-object detection algorithm.

13. The photography composition control method of claim 10, wherein the processing device obtains the environment feature information according to an environment detection algorithm.

14. The photography composition control method of claim 9, wherein the plurality of skeletons have different weights.

15. The photography composition control method of claim 9, further comprising:
   calculating, by the processing device, areas of the region of interest (ROI) of the first image and the ROI of the reference image; and
   generating the motion information according to the areas of the ROI of the first image and the ROI of the reference image.

16. The photography composition control method of claim 9, further comprising:

adjusting, by the processing device, a size of the second image according to the first image and the reference image.

\* \* \* \* \*